Patented Apr. 23, 1940

2,198,473

UNITED STATES PATENT OFFICE 2,198,473

DIPHENYLENE OXIDE COMPOSITIONS

Frank M. Clark, Pittsfield, Mass., assignor to General Electric Company, a corporation of New York No Drawing. Application March 18, 1937, Serial No. 131,633

6 Claims. (Cl. 106—17)

The present invention comprises new compositions which are suitable for various uses and in particular, for insulating and dielectric purposes in electric devices, and comprise halagenated diphenylene products. They are suitable for use either alone or in admixture with other materials, as will be later described.

Heretofore, compositions comprising chlorinated diphenyl and compositions comprising chlorinated diphenyl oxide have been found to be suitable for insulating and dielectric purposes. The lower chlorinated diphenyl products, such as those up to and including even chlorination products as high as the hexachlor product, are liquids when obtained as isomeric mixtures. The higher chlorinated products are solids even when the product consists of an isomeric mixture. The introduction of an oxygen atom (which distinguishes diphenyl oxide from diphenyl) has been found to increase the liquidity of the product. For example, the pentachlor diphenyl oxide obtained as a mixture of its isomers is even of lower viscosity and of lower pour point than the corresponding mixture consisting of the isomers of pentachlor diphenyl.

In the case of the chlorinated diphenyl and chlorinated diphenyl oxide products, the solid compositions which have a higher chlorine content than the heptachlor derivative are of relatively low melting points. It is only when the chlorination is carried to the extreme or when the chlor product is obtained as an individual isomer that solids of melting points higher than 100° C. are obtained. Under such conditions the product is distinctly crystalline and not well adapted for electrical use since it is most important to avoid in electrical insulation the presence of inter-crystalline voids in which ionization promotes electrical breakdown. These high chlorine content, solid products also have a low dielectric constant which further renders them unsuitable for some electrical purposes.

I have found that the introduction of the oxygen atom uniting carbons in the ortho position, with respect to the carbons which are tied directly to one another, unexpectedly produces a marked effect in the isomeric chlorinated mixtures obtained by direct chlorination of the parent molecule. This molecular arrangement results in diphenylene oxide in which occur both the direct carbon bond and the carbon-to-carbon bond through an intermediate oxygen atom.

In the case of the direct chlorination of diphenylene oxide instead of obtaining liquid isomeric mixtures, solid products are always obtained, some of which are of wax-like consistency. Furthermore, these solid products can be obtained with melting points as high as 120 to 125° C., and in a condition free from crystallinity. The wax-like products obtained are well-suited for electrical impregnating purposes as well as for other applications for which a high melting material is desired. The waxy products obtained appear to possess many of the properties of solid solutions and unlike solid products in general have unexpectedly high dielectric constants as will hereinafter more fully be explained.

In accordance with my present invention I have provided new and useful compositions comprising mixtures including chlorinated diphenyl (in some cases also trichlorbenzene), and as an essential ingredient diphenylene oxide containing combined chlorine, the amount of combined chlorine varying with the conditions of the chlorination over a relatively wide range of percentages.

In accordance with my processes of direct chlorination of diphenylene oxide, I pass chlorine into the melted diphenylene oxide at a temperature within the range of 125 to 180° C. in the presence of a catalyst. As a catalyst, either iron or antimony or iron chloride or antimony chloride may be used. Antimony is preferred for the preparation of the higher chlorinated isomeric diphenylene oxide mixtures as, for example, for the preparation of the pentachlor or higher chlorination products.

The time and temperature to be employed for chlorination will vary for different desired end products and for different conditions. For example, under a given set of conditions for the preparation of monochlor diphenylene oxide, chlorination at a temperature of about 125 to 150° C. continued for about four hours sufficed. For the preparation of the dichlor product chlorination at a temperature of 125 to 180° C. should be continued for about ten hours. To produce the trichlor product requires eighteen hours chlorination at about 125 to 180° C. and to produce the tetrachlor requires about twenty-five to thirty hours chlorination at 125 to 180° C. The products obtained under these conditions are mixtures of different isomers and unless especially purified are associated with some lower and some higher chlorination products. Diphenylene oxide products containing more than two atoms of chlorine per mol for many purposes are preferred.

Upon completion of the desired chlorination reaction the product is freed from the catalyst and other undesired associated products by being washed with a dilute aqueous solution of an alkali and then is fractionally distilled, preferably under reduced pressure. The chlorination reaction proceeds with the greatest facility and efficiency to produce monochlor, dichlor, trichlor and tetrachlor diphenylene oxide products. Higher chlorination products may be produced by continuing the chlorination for a sufficiently long period.

The following table gives the properties of the mono-, di-, tri-, and tetrachlor products, these terms being used in the sense indicated above. By suitable and repeated purification treatment, chlorinated diphenylene products may be obtained which are substantially free from chlorination products other than the particular one indicated. For example, an isomeric mixture of trichlor diphenylene oxide may be obtained which contains very little dichlor, tetrachlor, and other products, and which has more restricted melting and boiling temperatures than the ranges indicated in this table:

| | Monochlor | Dichlor | Trichlor | Tetrachlor |
|---|---|---|---|---|
| Boiling range (25 mm.) ° C | 190–210 | 220–240 | 235–250 | 245–270 |
| Melting point do | 60–65 | 80–85 | 95–105 | 80–90 |
| Specific gravity 125°/15.5° | 1.20 | 1.27 | 1.31 | 1.37 |
| Condition | Solid | Waxy solid | Waxy solid | Solid |
| Color | White | White | White | White |
| 25° C. dielectric constant (solid) | 4 | 5 | 4.5 | 6.0 |
| 100° C. dielectric constant (liquid) | 3.7 | 3.9 | 4.6 | 5.0 |

The high dielectric constant of solid chlorinated diphenylene oxide products in the solid state renders such products of especial utility for use as insulating and dielectric materials in electric devices in which high capacitance is desired, for example, in capacitors (condensers), capacitance bushings and cables. Solid dielectric materials are superior to liquid materials for some classes of service. For example, for use in the radio and small motor field electric capacitors containing solid dielectric materials are preferred.

The physical properties and chemical stability of isomeric mixtures of chlorinated diphenylene oxides render such compounds particularly adapted for capacitor dielectric purposes for fields in which a solid material is desired, as described in U. S. Patent No. 2,170,782, patented August 22, 1939.

For impregnating cable joints, I prefer to use the isomeric mixture of the monochlor diphenylene oxide which has a melting point of about 60 to 65° C.

For impregnating transformers, the tetrachlor compound which has the highest melting point is most satisfactory.

For filling electric bushings many of the chlorinated products ranging from the mono- to the tetrachlor may be used.

For some electrical applications, especially for the impregnation of transformers, complete noninflammability of the compound is desired, especially for indoor installations. For such purposes the tetrachlor and pentachlor derivatives are the best suited. These products will not burn and evolve only substantially non-inflammable gases when decomposed by an electric arc.

My new materials are suitable for use in combination with other products such as mineral oil, waxes, tars, asphalts, pitches, and other dielectric liquids or solids. Thus, unexpectedly, the freezing point of liquid pentachlor diphenyl may be depressed through the addition of solid tetrachlor diphenylene oxide. Pentachlor diphenyl has an A. S. T. M. pour point of about 10° C. and solidifies at about 0° C. The addition of from 10 to 20 per cent of the tetrachlor diphenylene oxide depresses the pour point to about 0° and reduces the solidification point such that even at −17° C. the mixture is plastic, with corresponding decrease in the temperature at which the marked drop in dielectric constant occurs.

As indicated in the table of properties, the dielectric constant of the various chlorinated isomeric mixtures of diphenylene oxide shows no material decrease in capacity on solidification. The data as given indicates the high dielectric constant of the material at room temperature in the solid state as compared to the lower dielectric constant at 100° C. in the liquid state. The various chlorinated isomeric mixtures of diphenylene oxide also possess an unexpected and highly favorable dielectric constant characteristic in the treated dielectric. When the isomeric mixture consisting of the various pentachlor diphenyls or pentachlor diphenyl oxides are used to impregnate cellulosic insulation, a capacitor containing such material shows a drop in capacity in passing from 25 to 75° C. The normal drop expected is such that the capacity at 75° C. is from 4 per cent to 5 per cent lower than the 25° C. capacity. This is a disadvantage for in many capacitor applications, stability of electrical capacity with normal temperature changes is highly desired. When the same dielectric cellulosic material is impregnated with the isomeric mixtures of the chlorinated diphenylene oxide, the capacity unexpectedly increases with an increase in temperature. As an example of this surprising capacity characteristic, capacitors impregnated with the isomeric mixture of the trichlor diphenylene oxide may be considered. Kraft paper capacitors impregnated with this material showed a capacity at 25° C., 220 volts per mil, of 1.785 microfarads. At 75° C., the capacity was 1.980 microfarads, an increase of approximately 11 per cent. The following table gives the average per cent increase in microfarad capacity for the various chlorinated isomeric mixtures in combination with kraft capacitor paper:

| Chlorinated isomeric mixture used as the impregnant | Percent increase in microfarad capacity in passing from 25° C. to 75° C. |
|---|---|
| Monochlor | 15 |
| Dichlor | 6 |
| Trichlor | 5 |
| Tetrachlor | 10.5 |

Heretofore, it has been accepted that in order to obtain a constant electrical capacity for the treated paper dielectric, it is necessary to use an impregnant of low dielectric constant. The most common impregnant and the one best adapted to give a constant dielectric capacity with changing temperature has been assumed to be mineral oil. The unexpected behavior of the solid isomeric chlorinated mixtures of diphenylene oxide makes available a high dielectric constant mixture of constant capacity characteristics in treated paper condensers. For example, it has already been stated that the isomeric mixture of pentachlor diphenyl or pentachlor diphenyl oxide behaves as expected in that the treated condensers decrease in electrical capacity with increasing temperature. By properly blending the chlorinated diphenylene oxide as herein described with such compounds as pentachlor diphenyl or pentachlor diphenyl oxide mixtures, it is possible to obtain an impregnant which when used to treat condenser paper, gives a capacitor of constant electrical capacity with temperature change in the normal range met in practice (25 to 75° C.). For example, although a capacitor impregnated with a pentachlor diphenyl liquid mixture shows a decrease of 4 per cent in electrical capacity in passing from 25 to 75° C., when this same pentachlor diphenyl is blended with the trichlor diphenylene oxide mixture herein described in the ratio of 85 parts of the pentachlor diphenyl to 15 parts of the trichlor diphenylene oxide, the capacity change, in passing from 25 to 75° C., is reduced to approximately 2.9 per cent decrease. A substantially constant electrical capacity of the treated unit may be obtained by suitably combining a halogenated diphenylene oxide with another dielectric material.

The following compositions introduced as impregnants in capacitors containing paper or other cellulosic insulation result in substantial constancy of capacity over a range of temperatures from 25 to 75° C.: mixtures of 20-25 per cent monochlor diphenylene oxide and 80-75 per cent pentachlor diphenyl; mixtures of 30-40 per cent of dichlor diphenylene oxide and 70-60 per cent pentachlor diphenyl; mixtures of 30-45 per cent trichlor diphenylene oxide and 70-55 per cent pentachlor diphenyl and mixtures of 25-30 per cent of tetrachlor diphenylene oxide and 75-70 per cent of pentachlor diphenyl. All of these mixtures are by weight.

In order to retain the non-inflammability of the final mixture, it is preferred to use the trichlor diphenylene oxide product or a product having a higher degree of chlorination.

In some cases chlorinated diphenylene oxide can to advantage be associated with both chlorinated diphenyl and trichlorbenzene, thereby producing a composition of especially low congealing temperature. For example, a mixture consisting by weight of 50 parts pentachlor diphenyl, 40 parts trichlorbenzene, and 10 parts trichlor diphenylene oxide, will remain liquid indefinitely at temperatures as low as −17° C. By contrast, a mixture consisting of equal parts of chlorinated diphenyl and trichlorbenzene when subjected to a temperature of −17° C. solidifies after one or two days' exposure to this temperature.

What I claim as new and desire to secure by Letters Patent of the United States, is:

1. A composition of matter comprising substantial proportions respectively of chlorinated diphenyl and chlorinated diphenylene oxide, containing one to four atoms of chlorine per mol, and being characterized by imparting substantially constant electrical capacity when impregnating paper dielectric in a capacitor.

2. A composition of matter comprising substantial proportions respectively of chlorinated diphenyl, chlorinated diphenylene oxide and trichlorbenzene, said composition being characterized by remaining liquid at temperatures at which similar compositions in which said diphenylene compound is absent become solidified.

3. A composition of matter comprising by weight a mixture of isomers of about 50 parts pentachlor diphenyl, 40 parts trichlorbenzene, and 10 parts trichlor diphenylene oxide, said mixture remaining liquid indefinitely at −17° C.

4. A composition of matter comprising about 20 to 40 per cent by weight of chlorinated diphenylene oxide and about 80 to 60 per cent of chlorinated diphenyl.

5. A composition of matter comprising a substantial proportion of a diphenylene oxide containing three to four atoms of chlorine per mol and a substantial proportion of pentachlor diphenyl, said composition imparting substantially constant electrical capacity to a paper-insulated capacitor in a range of 25 to 75° C.

6. A range of compositions of matter consisting by weight of about 30 to 45 parts of trichlor diphenylene oxide and 70 to 55 parts of pentachlor diphenyl, said compositions when introduced as impregnants in capacitors containing cellulosic insulation resulting in substantial constancy of capacity over a temperature range of 25 to 75° C.

FRANK M. CLARK.

CERTIFICATE OF CORRECTION.

Patent No. 2,198,473. April 23, 1940.

FRANK M. CLARK.

It is hereby certified that error appears in the printed specification of the above numbered patent requiring correction as follows: Page 1, first column, line 4-5, for "halagenated" read --halogenated--; page 2, first column, line 33, in the table, for "4.5" read --5.5--; and that the said Letters Patent should be read with this correction therein that the same may conform to the record of the case in the Patent Office.

Signed and sealed this 18th day of June, A. D. 1940.

(Seal)

Henry Van Arsdale,
Acting Commissioner of Patents.